(12) United States Patent
Cao

(10) Patent No.: US 10,362,298 B2
(45) Date of Patent: Jul. 23, 2019

(54) SHUTTER GLASSES, DISPLAY SYSTEM AND SHUTTER DISPLAY METHOD

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/772,057

(22) PCT Filed: Dec. 27, 2017

(86) PCT No.: PCT/CN2017/118917
§ 371 (c)(1),
(2) Date: Apr. 28, 2018

(87) PCT Pub. No.: WO2018/227934
PCT Pub. Date: Dec. 20, 2018

(65) Prior Publication Data
US 2019/0068961 A1 Feb. 28, 2019

(30) Foreign Application Priority Data

Jun. 12, 2017 (CN) .......................... 2017 1 0438916

(51) Int. Cl.
*H04N 13/341* (2018.01)
*H04N 13/398* (2018.01)
*G02F 1/133* (2006.01)

(52) U.S. Cl.
CPC ....... *H04N 13/341* (2018.05); *G02F 1/13306* (2013.01); *H04N 13/398* (2018.05); *H04N 2213/008* (2013.01)

(58) Field of Classification Search
CPC ...... G09G 5/14; G02B 27/2214; G02B 7/365; G03B 13/36; G03B 17/14; G02F 1/13306;
(Continued)

(56) References Cited

U.S. PATENT DOCUMENTS

| 2011/0157494 A1* | 6/2011 | Hung ..................... G09G 3/003 349/15 |
| 2012/0019637 A1* | 1/2012 | Ko ..................... G02B 27/2264 348/56 |

FOREIGN PATENT DOCUMENTS

| CN | 102395038 A | 3/2012 |
| CN | 102469336 A | 5/2012 |

(Continued)

*Primary Examiner* — Robert Chevalier
(74) *Attorney, Agent, or Firm* — Andrew C. Cheng

(57) ABSTRACT

Shutter glasses, used for watching a display device, comprises a first lens, a second lens, a driving circuit and a processor; both the first lens and the second lens are divided into a plurality of sections from top to bottom, and the driving circuit is connected to the plurality of sections of the first lens and the plurality of sections of the second lens to drive the corresponding sections to be opened and transparent; the processor is connected to the driving circuit to determine an updated area of a display image of the display device, which is currently updated and to determine the sections of the first lens and/or the sections of the second lens corresponding to the updated area, and to control the driving circuit to drive the sections of the first lens and/or the sections of the second lens corresponding to the updated area to be opened.

19 Claims, 8 Drawing Sheets

(58) Field of Classification Search
CPC ............... H04N 13/398; H04N 13/341; H04N 2213/008
USPC .......... 348/56, 42, 51, 46, 47; 386/326, 223, 386/200
See application file for complete search history.

(56) References Cited

FOREIGN PATENT DOCUMENTS

| | | |
|---|---|---|
| CN | 102572496 A | 7/2012 |
| CN | 103250090 A | 8/2013 |
| CN | 107037623 A | 8/2017 |
| KR | 20140097741 A | 8/2014 |

* cited by examiner

SHUTTER GLASSES, DISPLAY SYSTEM AND SHUTTER DISPLAY METHOD

CROSS REFERENCE

This application claims the priority of Chinese Patent Application No. 201710438916.9, entitled "Shutter glasses, display system and shutter display method", filed on Jun. 12, 2017, the disclosure of which is incorporated herein by reference in its entirety.

FIELD OF THE INVENTION

The present application relates to a glasses, and more particularly to shutter glasses, a display system and a shutter display method.

BACKGROUND OF THE INVENTION

Currently, the liquid crystal displays have been widely used. With the improvement of people's needs and advances in technology, there are more and more liquid crystal displays capable of providing 3D (three-dimensional) display. Now, 3D liquid crystal displays mainly are shutter-type 3D liquid crystal displays. The shutter-type 3D liquid crystal displays usually require the 3D shutter glasses for function. The principle of the shutter-type 3D liquid crystal displays is to drive the LCD panel of the 3D liquid crystal display to show the left-eye image and the right-eye image in sequence, and meanwhile, to control the opening and closing of the 3D shutter glasses so that the left eye of the human sees the left-eye image and the right eye of the of the human sees the right-eye image for realizing the 3D display effect. However, due to the hold characteristic of the liquid crystals, there is a certain reaction time. It causes that the liquid crystal panel always switches from the previous image slowly when showing one image. Thus, as the 3D shutter glasses are opened, the slowly switching process can be captured by human eyes, thereby causing crosstalk and affecting the 3D display effect. Especially when the liquid crystal display shows a high-speed motion image, the crosstalk becomes strong and greatly affects the viewing effect.

For reducing the crosstalk, the common method is to adopt a voltage increasing drive or to insert a black image between the left-eye image and the right-eye image to improve the dynamic response of the image. Although the voltage increasing drive can reduce the display crosstalk in a certain degree, the effect is limited and the cost is high. Inserting the black image will increase the frame frequency to result in increases of the temperature and the power consumption.

SUMMARY OF THE INVENTION

The present invention provides shutter glasses, a display system and a shutter display method. The viewing effect can be enhanced when the display device is viewed through the shutter glasses.

The present application provides shutter glasses, used for watching a display device, comprising a first lens, a second lens, a driving circuit and a processor. Both the first lens and the second lens are divided into a plurality of sections from top to bottom. The driving circuit is electrically connected to the plurality of sections of the first lens and the plurality of sections of the second lens to drive the corresponding sections to be opened and transparent. The processor is connected to the driving circuit to determine an updated area of a display image of the display device, which is currently updated and to determine the sections of the first lens and/or the sections of the second lens corresponding to the updated area, and to control the driving circuit to drive the sections of the first lens and/or the sections of the second lens corresponding to the updated area to be opened.

The plurality of sections of the first lens and the plurality sections of the second lens correspond to a plurality of row areas updated from top to bottom of the display image of the display device from top to bottom, respectively, and as updating one row area of the display image of the display device is completed, the processor controls the driving circuit to drive the sections of the first lens and/or the sections of the second lens corresponding to the one row area to be opened and to keep the opened sections open.

The display device shows a three-dimensional image including a left-eye display image and a right-eye display image alternately displayed, and as updating one row area of the left-eye display image of the display device is completed, the processor controls the driving circuit to drive the sections of the first lens corresponding to the one row area to be opened and to keep the opened sections open; the processor controls all the sections of the first lens to be closed as the display device has shown the left-eye display image and is going to show the right-eye display image, and as updating one row area of the right-eye display image of the display device is completed, the processor controls the driving circuit to drive the sections of the second lens corresponding to the one row area to be opened and to keep the opened sections open.

The display device shows a two-dimensional image, and as updating one row area of the display image of the display device is completed, the processor controls the driving circuit to drive the sections of the first lens and/or the sections of the second lens corresponding to the one row area to be opened and to keep the opened sections open.

The first lens and the second lens both comprise a driving electrode layer, an opening and closing layer and a common electrode layer, and the opening and closing layer is located between the driving electrode layer and the common electrode layer, and the driving electrode layer comprises a plurality of independent electrode areas, and each of the electrode areas corresponds to one of the sections of the first lens or the sections of the second lens, and the driving circuit is connected to all the electrode areas of the driving electrode layer of the first lens and the driving electrode layer of the second lens to independently apply a voltage to the corresponding electrode area and the common electrode layer is grounded, and as the voltage is applied to one electrode area of the driving electrode layers, an area of the opening and closing layer corresponding to the electrode area is opened; as updating one row area of the display image of the display device is completed, the processor controls the driving circuit to apply a driving voltage to the electrode areas of the corresponding sections of the first lens and/or the corresponding sections of the second lens to control the area of the opening and closing layer corresponding to the electrode area applied with the driving voltage to be opened, and controls the driving circuit to constantly apply the voltage to the electrode area corresponding to the corresponding sections of the first lens and/or the sections of the second lens for constantly keeping the opened sections open.

The opening and closing layer is a liquid crystal molecular layer containing a large amount of liquid crystal molecules, and as one electrode area of the first lens or the second lens is applied with the driving voltage, a potential difference is formed between the electrode area and the common electrode layer, and the liquid crystal molecules in the area of the opening and closing layer corresponding to the electrode area applied with the driving voltage will rotate at the same time to be perpendicular to a light exit surface of the first lens or the second lens for allowing light to pass through the corresponding area, and as the electrode area is not applied with the driving voltage, the liquid crystal molecules in the area of the opening and closing layer corresponding to the electrode area are disorderly arranged to block light from passing through.

The present application further provides a display system, comprising a display device and shutter glasses, used for watching the display device, comprising a first lens, a second lens, a driving circuit and a processor. Both the first lens and the second lens are divided into a plurality of sections from top to bottom. The driving circuit is electrically connected to the plurality of sections of the first lens and the plurality of sections of the second lens to drive the corresponding sections to be opened and transparent. The processor is connected to the driving circuit to determine an updated area of a display image of the display device, which is currently updated and to determine the sections of the first lens and/or the sections of the second lens corresponding to the updated area, and to control the driving circuit to drive the sections of the first lens and/or the sections of the second lens corresponding to the updated area to be opened.

The present application further provides a display method, applied to shutter glasses for viewing a display device, wherein the shutter glasses comprises a first lens, a second lens, a processor and a driving circuit, and both the first lens and the second lens are divided into a plurality of sections from top to bottom, and the display method comprises steps of: determining an updated area of a display image of the display device, which is currently updated by the processor; determining the sections of the first lens and/or the sections of the second lens corresponding to the updated area by the processor; and controlling the driving circuit to drive the sections of the first lens and/or the sections of the second lens corresponding to the updated area to be opened by the processor.

The display device shows a three-dimensional image including a left-eye display image and a right-eye display image alternately displayed, and the step of controlling the driving circuit to drive the sections of the first lens and/or the sections of the second lens corresponding to the updated area to be opened by the processor comprises: as updating one row area of the left-eye display image of the display device is completed, the processor controls the driving circuit to drive the sections of the first lens corresponding to the one row area to be opened and to keep the opened sections open; controlling all the sections of the first lens to be closed as the display device has shown the left-eye display image and is going to show the right-eye display image by the processor; and as updating one row area of the right-eye display image of the display device is completed, the processor controls the driving circuit to drive the sections of the second lens corresponding to the one row area to be opened and to keep the opened sections open.

The display device shows a two-dimensional image, and the step of controlling the driving circuit to drive the sections of the first lens and/or the sections of the second lens corresponding to the updated area to be opened by the processor comprises: as updating one row area of the display image of the display device is completed, the processor controls the driving circuit to drive the sections of the first lens and/or the sections of the second lens corresponding to the one row area to be opened and to keep the opened sections open.

According to the shutter glasses, the display system and the shutter display method, by dividing the shutter glasses into a plurality of sections and gradually opening the corresponding sections following the updating of the display image of the display device, the viewing effect can be enhanced.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Below in conjunction with the accompanying drawings of the present invention in embodiments, the technical solutions in the embodiments of the present invention are clearly and completely described, obviously, the described embodiments are merely part of embodiments of the present invention rather than all embodiments. Based on the embodiments of the present invention, all other embodiments to those of ordinary skill in the premise of no creative efforts obtained, should be considered within the scope of protection of the present invention.

Figure 1:
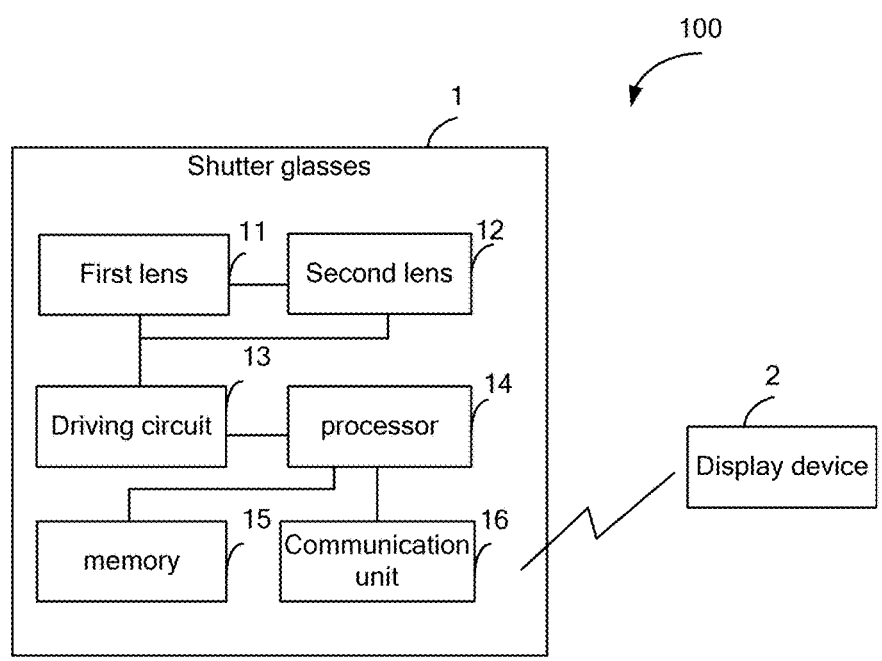
FIG. 1 is a structure diagram of a display system according to one embodiment of the present invention.

Please refer to FIG. 1, which is a structure diagram of a display system 100 according to one embodiment of the present invention. The display system 100 comprises shutter glasses 1 and a display device 2. The shutter glasses 1 are used to allow a user to wear for watching the display device 2.

As shown in FIG. 1, the shutter glasses 1 comprise a first lens 11, a second lens 12, a driving circuit 13 and a processor 14.

Figure 2:
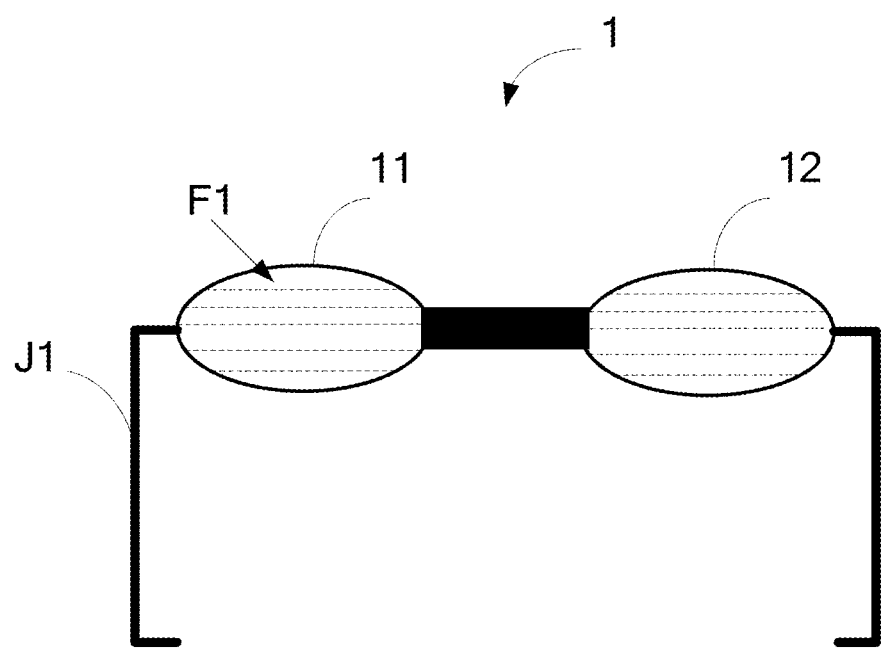
FIG. 2 is a diagram of shutter glasses according to one embodiment of the present invention.

Please refer to FIG. 2, which is a diagram of the shutter glasses 1. Both the first lens 11 and the second lens 12 of the shutter glasses 1 are divided into a plurality of sections F1 from top to bottom. The dashed lines on the first lens 11 and the second lens 12 in FIG. 2 are only used for indicating the boundaries between the sections F1, and not visible lines that are actually present on the first lens 11 and the second lens 12.

The driving circuit 13 is connected to the plurality of sections F1 of the first lens 11 and the plurality of sections F1 of the second lens 12 to drive the corresponding sections F1 to be opened and transparent. Each of the plurality of sections F1 can be independently opened by the driving circuit 13. When some section (one section) F1 is opened, the section F1 allows light to pass through. When the section F1 is closed, the section F1 blocks the light from passing through. Namely, in the present invention, the opening of the section F1 means that the section F1 allows the light to pass through and the closing of the section F1 means that the section F1 blocks the light from passing through.

The processor 14 is connected to the driving circuit 13 to determine an updated area of a display image of the display device 2, which is currently updated and to control the driving circuit 13 to drive the sections F1 of the first lens 11 and/or the sections F1 of the second lens 12 corresponding to the updated area to be opened according to the updated area of the display image of the display device 2, which is currently updated. Namely, after the processor 14 determines the updated area of the display image of the display device 2, which is currently updated, the processor 14 determines the sections F1 of the first lens 11 and/or the sections F1 of the second lens 12 corresponding to the updated area and controls the driving circuit 13 to drive the sections F1 of the first lens 11 and/or the sections F1 of the second lens 12 corresponding to the updated area to be opened.

As shown in FIG. 2, the shutter glasses 1 further comprises a frame J1. The first lens 11 and the second lens 12 are mounted on the frame J1. The driving circuit 13 and the processor 14 can be installed inside the frame J1.

Figure 3:
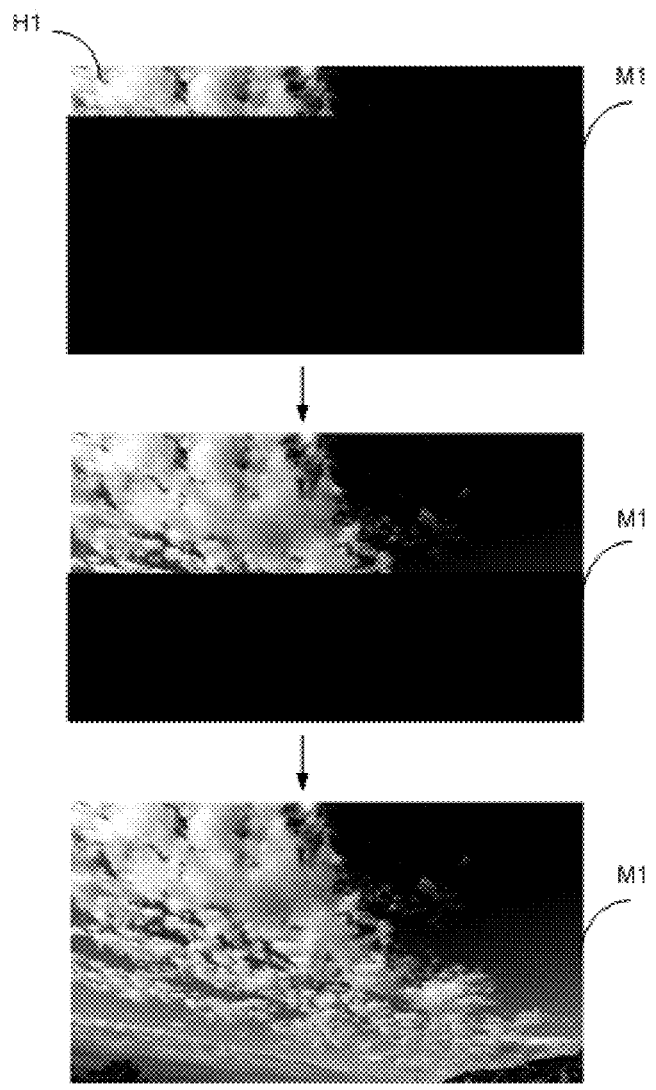
FIG. 3 is an updated diagram of a display image shown by a display device according to one embodiment of the present invention.

Please refer to FIG. 3, which is an updated diagram of a display image M1 shown by a display device 2. In some embodiments, each display image M1 of the display device 2 is updated from top to bottom by row scanning manner until the complete display image M1 is shown. The display device 2 sequentially updates and shows one row area H1 from top to bottom. The foregoing updated area is the row area H1 which is updated and shown. The plurality of sections F1 of the first lens 11 and the plurality sections F1 of the second lens 12 correspond to the plurality of row areas H1 updated from top to bottom of the display image M1 of the display device 2 from top to bottom, respectively. The display image M1 of the display device 2 corresponds to at least one of the first lens 11 and the second lens 12. Namely, the at least one of the first lens 11 and the second lens 12 of the shutter glasses 1 is used for watching the display image M1, which is currently updated. FIG. 3 only illustrates the updating process of the display image M1 at three different moments as an illustration. Apparently, the display image M1 is updated row by row with multiple rows. One row area H1 is updated at a time. The updating process of the display image M1 is greater than three.

In some embodiments, that the processor 14 controls the driving circuit 13 to drive the sections F1 of the first lens 11 and/or the sections F1 of the second lens 12 corresponding to the updated area to be opened comprises: as updating some row area H1 of the display image M1 of the display device 2 is completed, the processor 14 controls the driving circuit 13 to drive the sections F1 of the first lens 11 and/or the sections F1 of the second lens 12 corresponding to the row area H1 to be opened and to keep the opened sections F1 open. Thus, as updating all the row areas H1 on the display image M1 is completed, all the sections F1 of the first lens 11 and/or the sections F1 of the second lens 12 corresponding to the display image M1 are also opened.

As the processor 14 determines that the display device 2 has shown the current display image M1 and is going to start showing the next display image M1, the processor 14 controls all the sections F1 of the first lens 11 and/or the second lens 12 to be closed.

In some embodiments, the display device 2 is a three-dimensional display device and shows a three-dimensional image including a left-eye display image M11 and a right-eye display image M12 alternately displayed. In some embodiments, the left-eye display image M11 corresponds to the first lens 11 and the right-eye display image M12 corresponds to the second lens 12. That as updating some row area H1 of the display image M1 of the display device 2 is completed, the processor 14 controls the driving circuit 13 to drive the section F1 of the first lens 11 and/or sections F1 of the second lens 12 corresponding to the row area H1 to be opened and to keep the opened sections F1 open specifically comprises: as updating the one row area H1 of the left-eye display image M11 of the display device 2 is completed, the driving circuit 13 is controlled to drive the sections F1 of the first lens 11 corresponding to the one row area H1 to be opened and to keep the opened sections F1 open, thus, as updating all the row area H1 of the left-eye display image M11 is completed, all the sections F1 of the first lens 11 corresponding to the left-eye display image M11 are also opened; all the sections F1 of the first lens 11 are closed as the display device 2 has shown the left-eye display image M11 and is going to show the right-eye display image M12; as updating one row area H1 of the right-eye display image M12 of the display device 2 is completed, the processor 14 controls the driving circuit 13 to drive the sections F1 of the second lens 12 corresponding to the one row area H1 to be opened and to keep the opened sections F1 open, thus as updating all the row area H1 of the right-eye display image M12 is completed, all the sections F1 of the second lens 12 corresponding to the right-eye display image M12 are also opened.

Therefore, when the display device 2 shows a three-dimensional image, as updating the row area H1 of the corresponding left-eye display image M11 or right-eye display image M12 is completed, the corresponding section F1 of the first lens 11 or the second lens 12 is opened to let the opening time of the section F1 be postponed to the completion of the image updating of the corresponding row area. Accordingly, the human eyes cannot see the updating process of the image of the liquid crystal panel to reduce the 3D (three-dimensional) crosstalk.

Obviously, as the display device 2 has shown the right-eye display image M12 and is going to show the right-eye display image M11 of the next three-dimensional image, the processor 14 controls all the sections F1 of the second lens 12 to be closed and returns to control the first lens 11 as the left-eye display image M11 is shown. Namely, as updating some row area H1 of the left-eye display image M11 of the display device 2 is completed, the processor 14 controls the driving circuit 13 to drive the section F1 of the first lens 11 corresponding to the row area H1 to be opened and to keep the opened sections F1 open.

Figure 4:
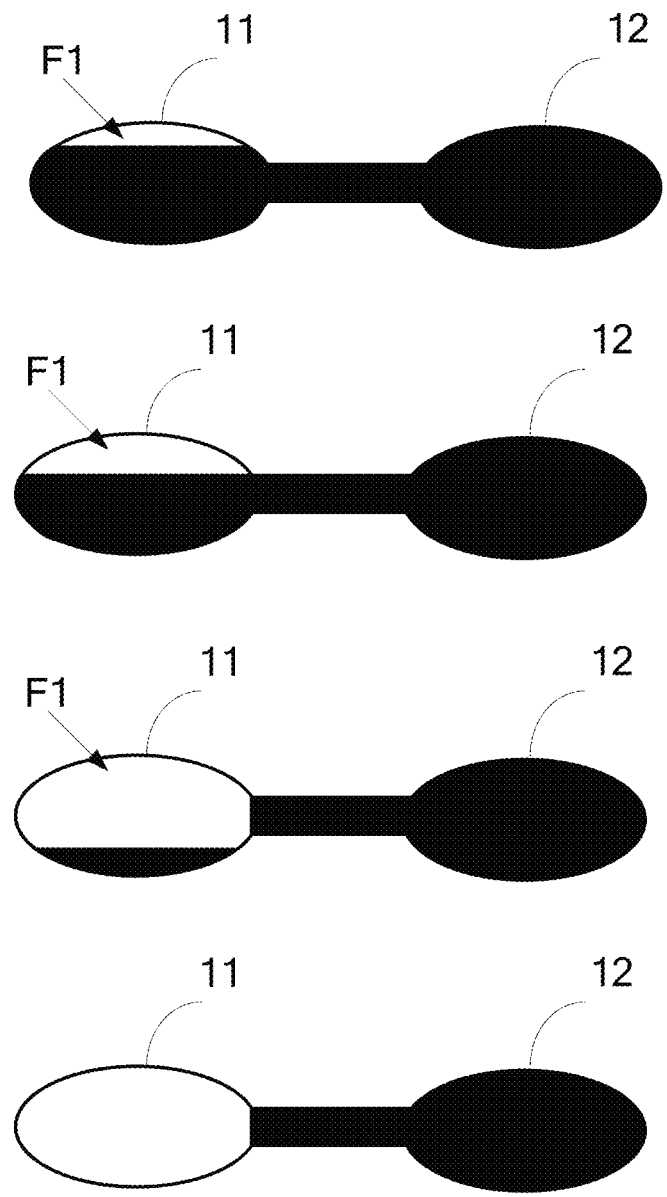
FIG. 4 is a diagram of gradually opening sections of a first lens of shutter glasses according to one embodiment of the present invention.

Please refer to FIG. 4, which is a diagram of gradually opening sections F1 of the first lens 11. When the display device 2 currently shows the left-eye display image M11, the sections F1 of the first lens 11 gradually open as updating of the row areas H1 of the left-eye display image M11 from top to bottom, and all the sections F1 of the second lens 12 are closed. For instance, as shown in FIG. 4, the section F1 at the top of the first lens 11 is opened in the beginning and the other sections F1 are closed. When the second row area H1 of the left-eye display image M11 is updated, the second section F1 of the first lens 11 is opened right after the one at the top. When the third row area H1 of the left-eye display image M11 is updated, the third section F1 of the first lens 11 is opened right after the second, and so on. As updating all the row areas H1 of the left-eye display image M11 is completed, all the sections F1 of the first lens 11 corresponding to the left-eye display image M11 are also opened.

In some embodiments, the display device 2 shows a two-dimensional image, and as updating some row area H1 of the display image M1 of the display device 2 is completed, the processor 14 controls the driving circuit 13 to drive the sections F1 of the first lens 11 and/or the sections F1 of the second lens 12 corresponding to the one row area H1 to be opened. That as updating all the row areas H1 of the display image M1 is completed, all the sections F1 of the first lens 11 and/or the sections F1 of the second lens 12 corresponding to the display image M1 are also opened specifically comprises: as updating some row area H1 of the display image M1 of the display device 2 is completed, the driving circuit 13 is controlled to drive the section F1 of the first lens 11 and the section F1 of the second lens 12 corresponding to the row area H1 to be opened and keep the opened sections F1 open. Thus, as updating all the row areas H1 of the display image M1 is completed, all the sections F1 of the first lens 11 and/or the sections F1 of the second lens 12 are also opened.

Thus, as the display device 2 shows the two-dimensional image and if the viewer wears the shutter glasses 1 to view the two-dimensional image shown by the display device 2, the dynamic response of the image can also be promoted, as watching the two-dimensional image, particularly the two-dimensional video to enhance the showing effect of the dynamic image by controlling the opening and closing the corresponding sections F1 of the first lens 11 and the corresponding sections F1 of the second lens 12.

Figure 5:
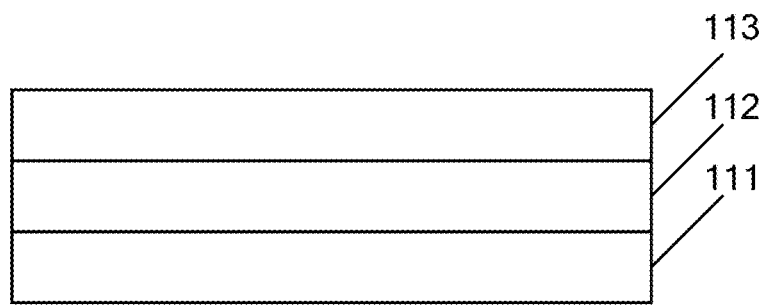
FIG. 5 is a sectional diagram of a first lens or a second lens of shutter glasses according to one embodiment of the present invention.

Please refer to FIG. 5, which is a sectional diagram of the first lens 11 or the second lens 12. The first lens 11 and the second lens 12 have the same structure, and each comprises a driving electrode layer 111, an opening and closing layer 112 and a common electrode layer 113. The opening and closing layer 112 is located between the driving electrode layer 111 and the common electrode layer 113.

Figure 6:
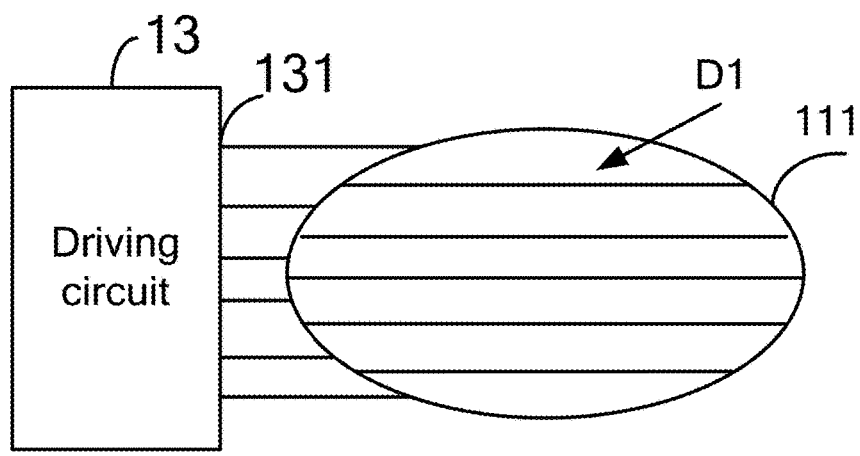
FIG. 6 is a diagram of a driving electrode layer of a first lens or a second lens of shutter glasses according to one embodiment of the present invention.

Please refer to FIG. 6, which is a planar diagram of the driving electrode layer 111. The driving electrode layer 111 comprises a plurality of independent electrode areas D1, and each of the electrode areas D1 corresponds to one of the sections F1 of the first lens 11 or the sections F1 of the second lens 12. The driving circuit 13 is connected to all the electrode areas D1 of the driving electrode layer 111 to independently apply a voltage to the corresponding electrode area D1. The common electrode layer 113 is grounded, and as the voltage is applied to one electrode area D1 of the driving electrode layers 111, an area of the opening and closing layer 112 corresponding to the electrode area D1 is opened.

Both the driving electrode layer 111 and the common electrode layer 113 are formed with a transparent indium tin oxide (ITO) material. The plurality of independent electrode areas D1 of the driving electrode layer 111 is electrically isolated and close to each other. The plurality of independent electrode areas D1 form a complete driving electrode layer 111 from the naked eye. However, the electrode areas are electrically isolated and independent from each other. Thus, the plurality of independent electrode areas D1 can be independently driven without affecting the viewing effect of the first lens 11 or the second lens 12.

As the processor 14 determines that updating one row area H1 of the display image M1 of the display device 2 is completed, the driving circuit 13 is controlled to apply a driving voltage to the electrode areas D1 of the corresponding sections F1 of the first lens 11 and/or the corresponding sections F1 of the second lens 12 to control the area of the opening and closing layer 112 corresponding to the electrode area D1 applied with the driving voltage to be opened, and the driving circuit 13 is controlled to constantly apply the voltage to the electrode area D1 corresponding to the corresponding sections F1 of the first lens 11 and/or the sections F1 of the second lens 12 for constantly keeping the opened sections F1 open before the display image M1 is completely shown.

As shown in FIG. 6, the driving circuit 13 comprises a plurality of driving pins 131. Each of the driving pins 131 is electrically connected to some independent electrode area D1 of the first lens 11 and the second lens 12. In some embodiment, as shown in FIG. 1, the shutter glasses 1 further comprises a memory 15. The memory 15 also stores the corresponding relationship between the sections F1 and the drive pins 131. The corresponding relationship between the sections F1 and the drive pins 131 includes the corresponding relationships between the plurality of sections F1 of the first lens 11 and the second lens 12 and the plurality of drive pins 131. As the processor 14 determines that updating some row area H1 of the display image M1 of the display device 2 is completed, the section F1 of the first lens 11 and/or the section F1 of the second lens 12 is determined and the corresponding driving pin 131 is determined according to the corresponding relationship of the section F1 and the driving pin 131. Then, the driving circuit 13 is controlled to output the driving voltage through the determined driving pin 131.

In some embodiments, the opening and closing layer 112 is a liquid crystal molecular layer containing a large amount of liquid crystal molecules. As some electrode area D1 of the first lens 11 or the second lens 12 is applied with the driving voltage, a potential difference is formed between the electrode area D1 and the common electrode layer 113, and according to the characteristics of liquid crystal molecules, the liquid crystal molecules in the area of the opening and closing layer 112 corresponding to the electrode area D1 applied with the driving voltage will rotate at the same time to be perpendicular to a light exit surface of the first lens 11 or the second lens 12 for allowing light to pass through the corresponding area. As the electrode area D1 is not applied with the driving voltage, the liquid crystal molecules in the area of the opening and closing layer 112 corresponding to the electrode area D1 are disorderly arranged to block light from passing through.

As shown in FIG. 1, the shutter glasses 1 further comprises a communication unit 16. The communication unit 16 is used to perform data communication with the display device 2 in a wired or wireless manner. The processor 14 acquires a currently updated row area H1 of the display image M1 shown by the display device 2 through the communication unit 16 for determining the currently updated row area of the display image shown by the display device. Meanwhile, the processor 14 acquires the information whether the currently updated row area H1 of the display image shown by the display device 2 is the left-eye display image or the right-eye display image through the communication unit 16.

The processor 14 may be a microcontroller, a microprocessor, a central processor, a microcontroller or a digital signal processor. The memory 15 may be a flash memory card or a read-only memory. The communication unit 16 can be a wireless communication module, such as a Bluetooth communication module or a WIFI communication module or can be a wired communication module, such as a USB interface module. In some embodiments, the driving circuit 13 and the processor 14 may be integrated as a control chip.

The display device 2 may be a liquid crystal display or a liquid crystal television having two-dimensional and three-dimensional display functions.

Figure 7:
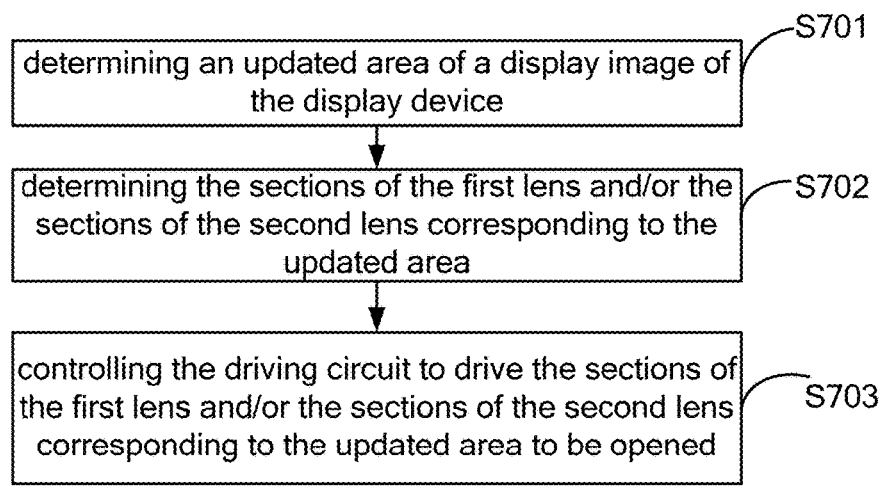
FIG. 7 is a flowchart of a display method according to one embodiment of the present invention.

Please refer to FIG. 7, which is a flowchart of a display method according to one embodiment of the present invention. The display method is applied to shutter glasses 1 for viewing a display device 2. The display method comprises steps of:

Step S701, determining an updated area of a display image of the display device 2, which is currently updated, by the processor 14. In some embodiments, the display device 2 updates several row areas H1 from top to bottom in a row scan manner for the display image. Specifically, an updated area, such as a currently updated row area of the display image M1 shown by the display device 2 is acquired through the communication unit 16.

Step S702, determining the sections F1 of the first lens 11 and/or the sections F1 of the second lens 12 corresponding to the updated area by the processor 14.

Step S703, controlling the driving circuit 13 to drive the sections F1 of the first lens 11 and/or the sections F1 of the second lens 12 corresponding to the updated area to be opened by the processor 14.

In some embodiments, Step S703 comprises: as updating some row area H1 of the display image M1 of the display device 2 is completed, the processor 14 controls the driving circuit 13 to drive the sections F1 of the first lens 11 and/or the sections F1 of the second lens 12 corresponding to the updated area to be opened. Thus, as updating all the row areas H1 of the display image M1 is completed, all the sections F1 of the first lens 11 and/or the sections F1 of the second lens 12 corresponding to the display image M1 are opened.

Figure 8:
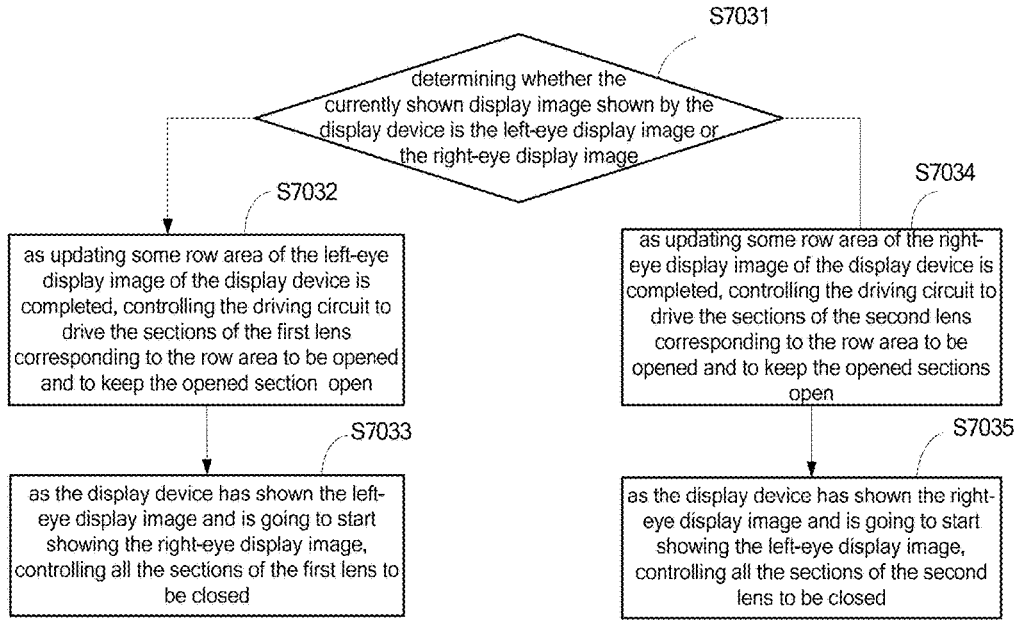
FIG. 8 is a sub flowchart of Step S703 in FIG. 7 of one embodiment.

Please refer to FIG. 8, which is a sub flowchart of Step S703 in one embodiment. In this embodiment, the display device 2 shows a three-dimensional image, including a left-eye display image M11 and a right-eye display image M12 alternately displayed. Step S703 comprises:

Step S7031, determining whether the currently shown display image M1 shown by the display device 2 is the left-eye display image M11 or the right-eye display image M12 by the processor 14; if it is the left-eye display image M11, then Step S7032 is executed, and if it is the right-eye display image M12, then Step S7034 is executed.

Step S7032: as updating some row area H1 of the left-eye display image M11 of the display device 2 is completed, the processor 14 controls the driving circuit 13 to drive the sections F1 of the first lens 11 corresponding to the row area H1 to be opened and to keep the opened section F1 open, and then executing Step S7033.

Step S7033, as the processor 14 determines that the display device 2 has shown the left-eye display image M11 and is going to start showing the right-eye display image M12, the processor 14 controls all the sections F1 of the first lens 11 to be closed.

Step S7034: as updating some row area H1 of the right-eye display image M12 of the display device 2 is completed, the processor 14 controls the driving circuit 13 to drive the sections F1 of the second lens 12 corresponding to the row area H1 to be opened and to keep the opened sections F1 open.

As shown in FIG. 8, in some embodiments, Step S703 further comprises steps of:

Step S7035, as the display device 2 has shown the right-eye display image M12 and is going to start showing the left-eye display image M11, the processor 14 controls all the sections F1 of the second lens 12 to be closed.

Figure 9:
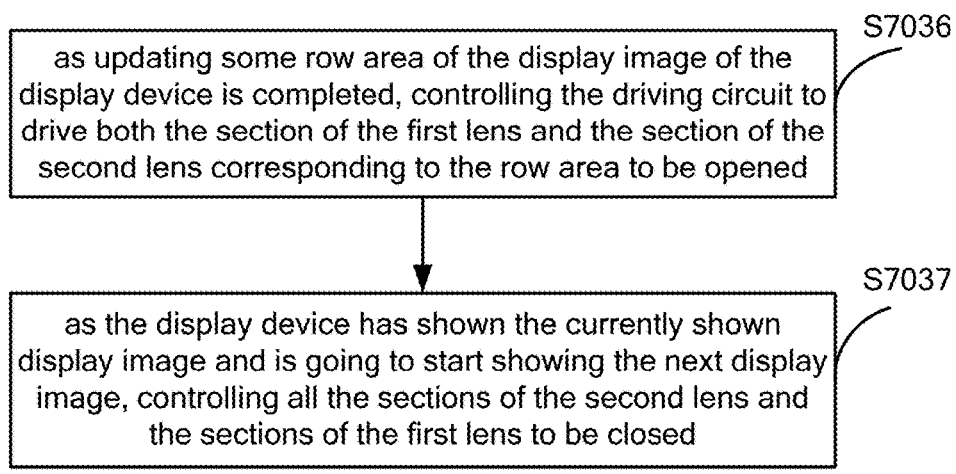
FIG. 9 is a sub flowchart of Step S703 in FIG. 7 of another embodiment.

Please refer to FIG. 9, which is a sub flowchart of Step S703 of another embodiment. In other embodiments, the display image M1 shown by the display device 2 is a two-dimensional image, and Step S703 comprises:

Step S7036, as updating some row area H1 of the display image M1 of the display device 2 is completed, the processor 14 controls the driving circuit 13 to drive both the section F1 of the first lens and the section F1 of the second lens 12 corresponding to the row area H1 to be opened.

Step S7037, as the processor determines that the display device 2 has shown the currently shown display image M1 and is going to start showing the next display image M1, the processor 14 controls all the sections F1 of the second lens 12 and the sections F1 of the first lens 11 to be closed.

Figure 10:
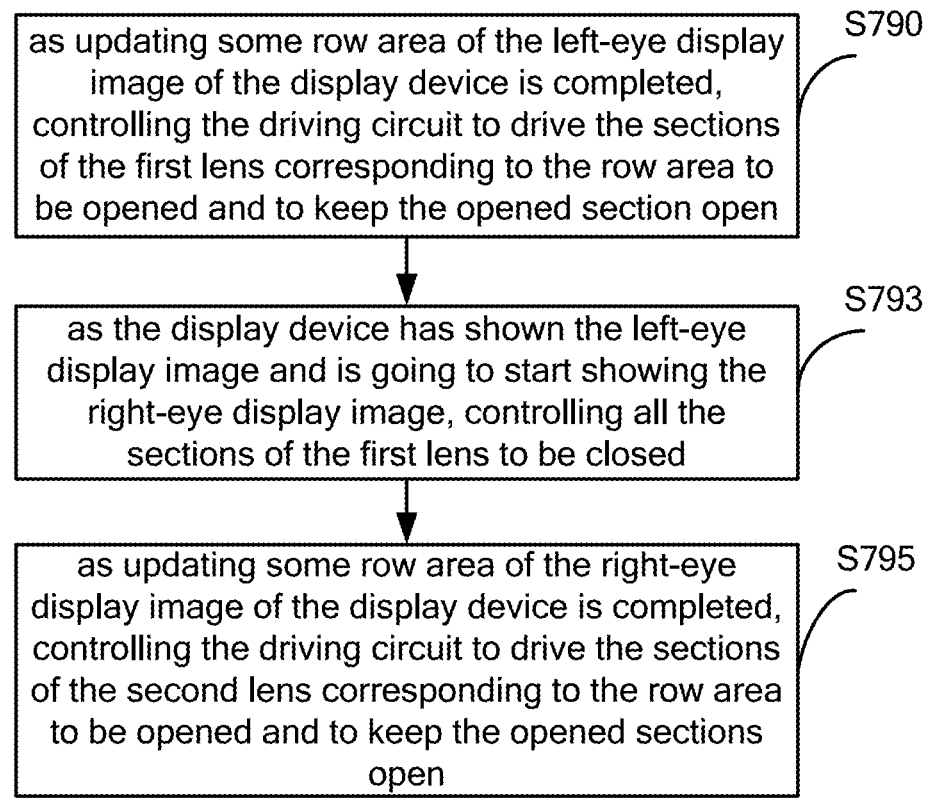
FIG. 10 is a sub flowchart of Step S703 in FIG. 7 of one another embodiment.

Please refer to FIG. 10, which is a sub flowchart of Step S703 in other embodiments. In FIG. 10, a flowchart of a three-dimensional image shown from the left eye to the right eye is illustrated. The step S703 comprises:

Step S790: as updating some row area H1 of the left-eye display image M11 of the display device 2 is completed, the processor 14 controls the driving circuit 13 to drive the sections F1 of the first lens 11 corresponding to the row area H1 to be opened and to keep the opened section F1 open.

Step S793, as the processor 14 determines that the display device 2 has shown the left-eye display image M11 and is going to start showing the right-eye display image M12, the processor 14 controls all the sections F1 of the first lens 11 to be closed.

Step S795: as updating some row area H1 of the right-eye display image M12 of the display device 2 is completed, the processor 14 controls the driving circuit 13 to drive the sections F1 of the second lens 12 corresponding to the row area H1 to be opened and to keep the opened sections F1 open.

The shutter glasses 1, the display system 100 and the display method of the present invention can greatly improve the viewing effect regardless of whether the display device 2 shows the two-dimensional image or the three-dimensional image.

Above are embodiments of the present invention, which does not limit the scope of the present invention. Any modifications, equivalent replacements or improvements within the spirit and principles of the embodiment described above should be covered by the protected scope of the invention.

What is claimed is:

1. Shutter glasses, used for watching a display device, comprising a first lens and a second lens, wherein both the first lens and the second lens are divided into a plurality of sections from top to bottom and the shutter glasses further comprises:

a driving circuit, electrically connected to the plurality of sections of the first lens and the plurality of sections of the second lens to drive the sections to be opened and transparent, correspondingly; and a processor, connected to the driving circuit to determine an updated area of a display image of the display device, which is currently updated and to determine the sections of the first lens and/or the sections of the second lens corresponding to the updated area, and to control the driving circuit to drive the sections of the first lens and/or the sections of the second lens corresponding to the updated area to be opened.

2. The shutter glasses according to claim 1, wherein the plurality of sections of the first lens and the plurality sections of the second lens correspond to a plurality of row areas updated from top to bottom of the display image of the display device from top to bottom, respectively, and as updating one row area of the display image of the display device is completed, the processor controls the driving circuit to drive the sections of the first lens and/or sections of the second lens corresponding to the one row area to be opened and to keep the opened sections open.

3. The shutter glasses according to claim 2, wherein the display device shows a three-dimensional image including a left-eye display image and a right-eye display image alternately displayed, and as updating one row area of the left-eye display image of the display device is completed, the processor controls the driving circuit to drive the sections of the first lens corresponding to the one row area to be opened and to keep the opened sections open; the processor controls all the sections of the first lens to be closed as the display device has shown the left-eye display image and is going to show the right-eye display image, and as updating one row area of the right-eye display image of the display device is completed, the processor controls the driving circuit to drive the sections of the second lens corresponding to the one row area to be opened and to keep the opened sections open.

4. The shutter glasses according to claim 1, wherein the display device shows a two-dimensional image, and as updating one row area of the display image of the display device is completed, the processor controls the driving circuit to drive the sections of the first lens and/or the sections of the second lens corresponding to the one row area to be opened and to keep the opened sections open.

5. The shutter glasses according to claim 3, wherein the first lens and the second lens both comprise a driving electrode layer, an opening and closing layer and a common electrode layer, and the opening and closing layer is located between the driving electrode layer and the common electrode layer, and the driving electrode layer comprises a plurality of independent electrode areas, and each of the electrode areas corresponds to one of the sections of the first lens or the sections of the second lens, and the driving circuit is connected to all the electrode areas of the driving electrode layer of the first lens and the driving electrode layer of the second lens to independently apply a voltage to the corresponding electrode area and the common electrode layer is grounded, and as the voltage is applied to one electrode area of the driving electrode layers, an area of the opening and closing layer corresponding to the electrode area is opened; as updating one row area of the display image of the display device is completed, the processor controls the driving circuit to apply a driving voltage to the electrode areas of the corresponding sections of the first lens and/or the corresponding sections of the second lens to control the area of the opening and closing layer corresponding to the electrode area applied with the driving voltage to be opened, and controls the driving circuit to constantly apply the voltage to the electrode area corresponding to the corresponding sections of the first lens and/or the sections of the second lens for constantly keeping the opened sections open.

6. The shutter glasses according to claim 4, wherein the first lens and the second lens both comprise a driving electrode layer, an opening and closing layer and a common electrode layer, and the opening and closing layer is located between the driving electrode layer and the common electrode layer, and the driving electrode layer comprises a plurality of independent electrode areas, and each of the electrode areas corresponds to one of the sections of the first lens or the sections of the second lens, and the driving circuit is connected to all the electrode areas of the driving electrode layer of the first lens and the driving electrode layer of the second lens to independently apply a voltage to the corresponding electrode area and the common electrode layer is grounded, and as the voltage is applied to one electrode area of the driving electrode layers, an area of the opening and closing layer corresponding to the electrode area is opened; as updating one row area of the display image of the display device is completed, the processor controls the driving circuit to apply a driving voltage to the electrode areas of the corresponding sections of the first lens and/or the corresponding sections of the second lens to control the area of the opening and closing layer corresponding to the electrode area applied with the driving voltage to be opened, and controls the driving circuit to constantly apply the voltage to the electrode area corresponding to the corresponding sections of the first lens and/or the sections of the second lens for constantly keeping the opened sections open.

7. The shutter glasses according to claim 5, wherein the opening and closing layer is a liquid crystal molecular layer containing a large amount of liquid crystal molecules, and as one electrode area of the first lens or the second lens is applied with the driving voltage, a potential difference is formed between the electrode area and the common electrode layer, and the liquid crystal molecules in the area of the opening and closing layer corresponding to the electrode area applied with the driving voltage will rotate at the same time to be perpendicular to a light exit surface of the first lens or the second lens for allowing light to pass through the corresponding area, and as the electrode area is not applied with the driving voltage, the liquid crystal molecules in the area of the opening and closing layer corresponding to the electrode area are disorderly arranged to block light from passing through.

8. The shutter glasses according to claim 6, wherein the opening and closing layer is a liquid crystal molecular layer containing a large amount of liquid crystal molecules, and as one electrode area of the first lens or the second lens is applied with the driving voltage, a potential difference is formed between the electrode area and the common electrode layer, and the liquid crystal molecules in the area of the opening and closing layer corresponding to the electrode area applied with the driving voltage will rotate at the same time to be perpendicular to a light exit surface of the first lens or the second lens for allowing light to pass through the corresponding area, and as the electrode area is not applied with the driving voltage, the liquid crystal molecules in the area of the opening and closing layer corresponding to the electrode area are disorderly arranged to block light from passing through.

9. A display system, comprising a display device and shutter glasses, used for watching the display device, comprising a first lens and a second lens, wherein both the first lens and the second lens are divided into a plurality of sections from top to bottom and the shutter glasses further comprises:
  a driving circuit, electrically connected to the plurality of sections of the first lens and the plurality of sections of the second lens to drive the sections to be opened and transparent, correspondingly; and
  a processor, connected to the driving circuit to determine an updated area of a display image of the display device, which is currently updated and to determine the sections of the first lens and/or the sections of the second lens corresponding to the updated area, and to control the driving circuit to drive the sections of the first lens and/or the sections of the second lens corresponding to the updated area to be opened.

10. The display system according to claim 9, wherein the plurality of sections of the first lens and the plurality sections of the second lens correspond to a plurality of row areas updated from top to bottom of the display image of the display device from top to bottom, respectively, and as updating one row area of the display image of the display device is completed, the processor controls the driving circuit to drive the sections of the first lens and/or the sections of the second lens corresponding to the one row area to be opened and to keep the opened sections open.

11. The display system according to claim 10, wherein the display device shows a three-dimensional image including a left-eye display image and a right-eye display image alternately displayed, and as updating one row area of the left-eye display image of the display device is completed, the processor controls the driving circuit to drive the sections of the first lens corresponding to the one row area to be opened and to keep the opened sections open; the processor controls all the sections of the first lens to be closed as the display device has shown the left-eye display image and is going to show the right-eye display image, and as updating one row area of the right-eye display image of the display device is completed, the processor controls the driving circuit to drive the sections of the second lens corresponding to the one row area to be opened and to keep the opened sections open.

12. The display system according to claim 9, wherein the display device shows a two-dimensional image, and as updating one row area of the display image of the display device is completed, the processor controls the driving circuit to drive the sections of the first lens and/or the sections of the second lens corresponding to the one row area to be opened and to keep the opened sections open.

13. The display system according to claim 11, wherein the first lens and the second lens both comprise a driving electrode layer, an opening and closing layer and a common electrode layer, and the opening and closing layer is located between the driving electrode layer and the common electrode layer, and the driving electrode layer comprises a plurality of independent electrode areas, and each of the electrode areas corresponds to one of the sections of the first lens or the sections of the second lens, and the driving circuit is connected to all the electrode areas of the driving electrode layer of the first lens and the driving electrode layer of the second lens to independently apply a voltage to the corresponding electrode area and the common electrode layer is grounded, and as the voltage is applied to one electrode area of the driving electrode layers, an area of the opening and closing layer corresponding to the electrode area is opened; as updating one row area of the display image of the display device is completed, the processor controls the driving circuit to apply a driving voltage to the electrode areas of the corresponding sections of the first lens and/or the corresponding sections of the second lens to control the area of the opening and closing layer corresponding to the electrode area applied with the driving voltage to be opened, and controls the driving circuit to constantly apply the voltage to the electrode area corresponding to the corresponding sections of the first lens and/or the sections of the second lens for constantly keeping the opened sections open.

14. The display system according to claim 12, wherein the first lens and the second lens both comprise a driving electrode layer, an opening and closing layer and a common electrode layer, and the opening and closing layer is located between the driving electrode layer and the common electrode layer, and the driving electrode layer comprises a plurality of independent electrode areas, and each of the electrode areas corresponds to one of the sections of the first lens or the sections of the second lens, and the driving circuit is connected to all the electrode areas of the driving electrode layer of the first lens and the driving electrode layer of the second lens to independently apply a voltage to the corresponding electrode area and the common electrode layer is grounded, and as the voltage is applied to one electrode area of the driving electrode layers, an area of the opening and closing layer corresponding to the electrode area is opened; as updating one row area of the display image of the display device is completed, the processor controls the driving circuit to apply a driving voltage to the electrode areas of the corresponding sections of the first lens and/or the corresponding sections of the second lens to control the area of the opening and closing layer corresponding to the electrode area applied with the driving voltage to be opened, and controls the driving circuit to constantly apply the voltage to the electrode area corresponding to the corresponding sections of the first lens and/or the sections of the second lens for constantly keeping the opened sections open.

15. The display system according to claim 13, wherein the opening and closing layer is a liquid crystal molecular layer containing a large amount of liquid crystal molecules, and as one electrode area of the first lens or the second lens is applied with the driving voltage, a potential difference is formed between the electrode area and the common electrode layer, and the liquid crystal molecules in the area of the opening and closing layer corresponding to the electrode area applied with the driving voltage will rotate at the same time to be perpendicular to a light exit surface of the first lens or the second lens for allowing light to pass through the corresponding area, and as the electrode area is not applied with the driving voltage, the liquid crystal molecules in the area of the opening and closing layer corresponding to the electrode area are disorderly arranged to block light from passing through.

16. The display system according to claim 14, wherein the opening and closing layer is a liquid crystal molecular layer containing a large amount of liquid crystal molecules, and as one electrode area of the first lens or the second lens is applied with the driving voltage, a potential difference is formed between the electrode area and the common electrode layer, and the liquid crystal molecules in the area of the opening and closing layer corresponding to the electrode area applied with the driving voltage will rotate at the same time to be perpendicular to a light exit surface of the first lens or the second lens for allowing light to pass through the corresponding area, and as the electrode area is not applied with the driving voltage, the liquid crystal molecules in the area of the opening and closing layer corresponding to the electrode area are disorderly arranged to block light from passing through.

17. A display method, applied to shutter glasses for viewing a display device, wherein the shutter glasses comprises a first lens, a second lens, a processor and a driving circuit, both the first lens and the second lens are divided into a plurality of sections from top to bottom and the display method comprises steps of:
  determining an updated area of a display image of the display device, which is currently updated by the processor;
  determining the sections of the first lens and/or the sections of the second lens corresponding to the updated area by the processor; and
  controlling the driving circuit to drive the sections of the first lens and/or the sections of the second lens corresponding to the updated area to be opened by the processor.

18. The display method according to claim 17, wherein the display device shows a three-dimensional image including a left-eye display image and a right-eye display image alternately displayed, and the step of controlling the driving circuit to drive the sections of the first lens and/or the sections of the second lens corresponding to the updated area to be opened by the processor comprises:
  as updating one row area of the left-eye display image of the display device is completed, the processor controls the driving circuit to drive the sections of the first lens corresponding to the one row area to be opened and to keep the opened sections open;
  controlling all the sections of the first lens to be closed as the display device has shown the left-eye display image and is going to show the right-eye display image by the processor; and
  as updating one row area of the right-eye display image of the display device is completed, the processor controls the driving circuit to drive the sections of the second lens corresponding to the one row area to be opened and to keep the opened sections open.

19. The display method according to claim 17, wherein the display device shows a two-dimensional image, and the step of controlling the driving circuit to drive the sections of the first lens and/or the sections of the second lens corresponding to the updated area to be opened by the processor comprises:
  as updating one row area of the display image of the display device is completed, the processor controls the driving circuit to drive the sections of the first lens and/or the sections of the second lens corresponding to the one row area to be opened and to keep the opened sections open.

* * * * *